April 23, 1946. G. KÄHR 2,399,124
METHOD OF MANUFACTURING COMPOSITE BOARDS
Filed Feb. 4, 1942
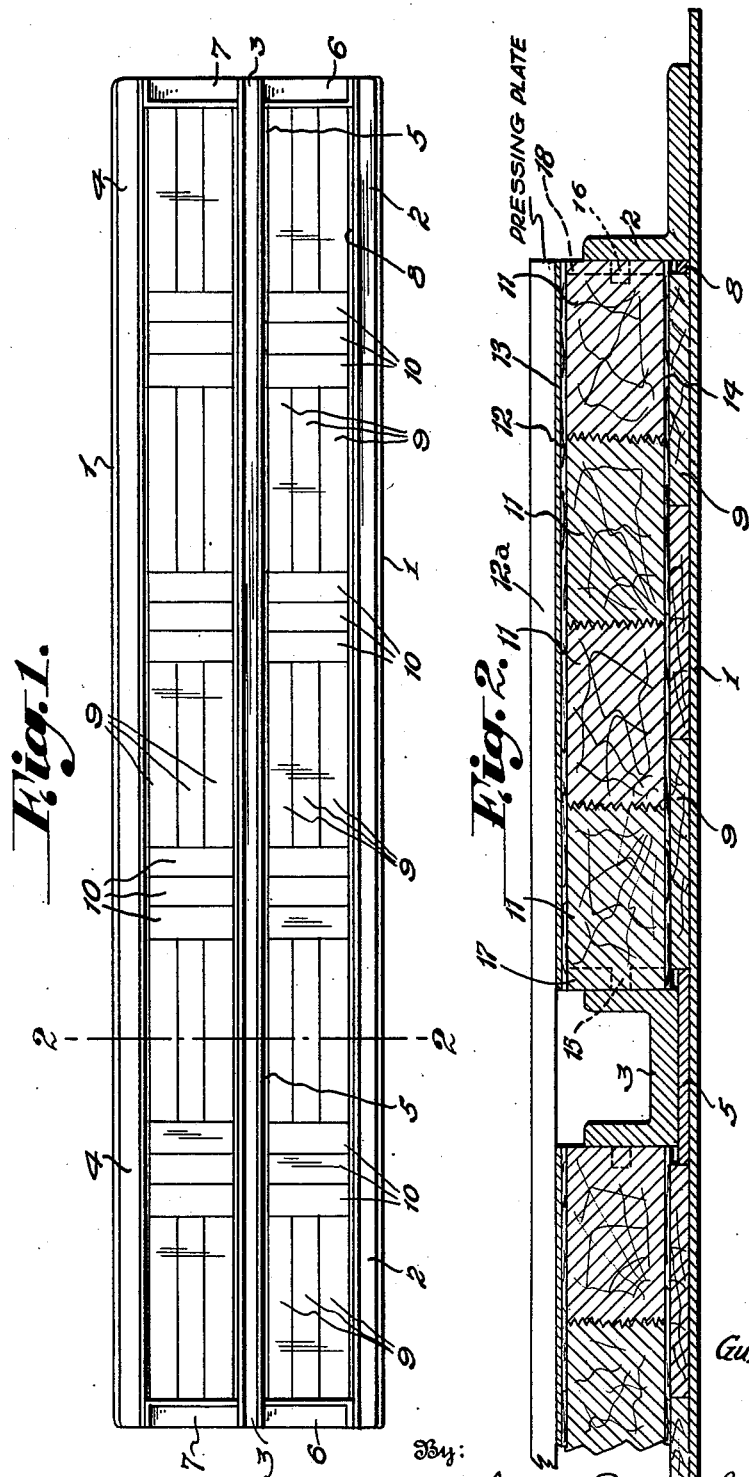
Inventor,
Gustaf Kähr
By:
Glascock Downing + Seebold Attorneys.

Patented Apr. 23, 1946

2,399,124

UNITED STATES PATENT OFFICE 2,399,124

METHOD OF MANUFACTURING COMPOSITE BOARDS

Gustaf Kähr, Stockholm, Sweden

Application February 4, 1942, Serial No. 429,568
In Sweden February 7, 1941

6 Claims. (Cl. 154—118)

The present invention relates to boards composed of a number of layers glued together and comprising an upper layer of parquet lengths arranged to a parquet pattern, a core layer of longitudinally extending pieces of wood, and one or more layers of veneer arranged at the lower side of the core layer. Such boards on having been glued together must be subjected to a subsequent treatment in a planing machine or a milling machine, for the purpose of producing straight and mutually parallel lateral edges, in which operation the boards may be rabbeted at the same time, if desired. In the manufacturing methods as hitherto known, it has been the practice for this purpose to give all of the layers from the beginning a width somewhat larger than that of the finished product. This, however, involves a drawback as far as the working of the parquet veneer layer is concerned, which generally consists of parquet lengths arranged alternately in the longitudinal direction and in a crosswise direction thereto and consisting of a harder material more difficult to operate upon. The parquet lengths extending in a crosswise direction may thus be severed at the ends thereof without difficulty, without the material being damaged at severe working, or without its becoming irregular at the edges thereof. On the other hand, a more careful treatment which, however, does not entirely exclude damage at the edge portions, entails a considerable loss of time and a higher manufacturing cost. The present invention has for its object to avoid the said drawback, and substantially consists in that the parquet lengths or the veneer layer composed therefrom is given from the beginning a width corresponding substantially to that of the finished parquet board, while the remaining layers are given a greater width, whereupon the layers are glued together and the board is operated upon along the edges thereof, until the width of the last-mentioned layer has been reduced to the width of the parquet veneer layer. This method also offers the advantage that the individual parquet lengths may be made from the beginning to the same width, and that this width will not be altered through the said working of the edges of the board. At the same time a saving of material is brought about with respect to the parquet veneer which usually consists of expensive materials.

A further object of the invention is to provide a method of manufacturing a composite board comprising at least three layers (1) of parquet lengths arranged in the fashion of a parquet pattern, (2) of veneer, and (3) of pieces of wood arranged side-by-side and extending lengthwise of the board, the third layer forming a core arranged between the other two layers. In accordance with the invention, the parquet layer is compressed laterally to a predetermined degree and the core layer is compressed laterally to a lesser degree while the board is prevented from moving perpendicularly to its opposite side surfaces, whereby the side edges of the composite board are straightened even if the individual lengths of the parquet and core layers are somewhat different in breadths. Before compression, an adhesive is placed between the layers.

The joining of several parts of the board is effected in a matrix provided with adjustable side walls, the two layers of parquet lengths being fixed in a laterally displaced relationship relatively to each other, corresponding to the different widths of the layers, by the same being pressed toward each other in a lateral direction between the side walls of the matrix.

The invention will be described more closely with reference to the accompanying drawing which illustrates a form of embodiment of a matrix used in the production of the board. Figure 1 shows this matrix as viewed from above, and Figure 2 is a cross section to a larger scale on line 2—2 in Figure 1. For the making of the boards, a matrix of the type shown in the drawing is brought into use, said matrix being intended, in the illustrated example, for the simultaneous manufacture of two boards. The matrix consists of a base plate 1 and of three longitudinally extending bars 2, 3, 4, of which the two outer bars 2, 4 are adjustable in a lateral direction, while the centrally arranged bar 3 is secured to the base plate together with a supporting bar 5 arranged between the base plate and the bar 3. The central bar 3 has a U-shaped cross section, whereas the bars 2, 4 consist of angle irons adapted to be adjusted by suitable means not shown in the drawing, and to be secured in different positions relatively to the base plate. The bars 2, 3, 4 form two parallel channels which are confined at the ends thereof by transversely extending angle irons 6, 7 which are adjustable, at least at the one end thereof, in the longitudinal direction of the matrix. Secured to the inside of the bars 2, 4 is a supporting bar 8 of the same height as that of the supporting bar 5. The supporting bars 5, 8 are intended to form supports for the parquet veneer layer which, as will appear from Figure 1, consists of parquet lengths 9, 10 arranged alternately in the longitudinal direction and in a crosswise direction thereto respectively. In addition to the said parquet veneer layer, the board is composed of a core or filling layer comprising a number of longitudinally extending parquet lengths 11 and a covering layer consisting of two veneer layers 12, 13, of which the inner one 12 is arranged with its run of grain extending in the transverse direction of the board, while the outer layer 13 has its run of grain extending in the longitudinal direction of the board. Arranged between the parquet lengths 11 and the parquet veneer layer is a binding layer 14 of veneer having its run of grain extending in the transverse direction of the board.

The manufacture takes place in the following manner. The parquet lengths 9, 10 are first made to lengths corresponding to the parquet pattern, and are then given the accurate dimensions as to width and length which they are to have in the finished board. Moreover, the lengths 11 intended to form the core layer or filling layer are cut out beforehand. These lengths may be of the same length as that of the board, and the lengths in question may be provided with incisions cut into them alternately from different sides and extending only partly through the parquet length so as to sever the fibres thereof, said incisions having for their object to prevent warping of the board. To render possible the use of inferior wood material, the core layer may be composed of comparatively short lengths, such as lengths not exceeding a longitudinal dimension of 10 to 20 centimeters, it being necessary, however, that the lengths in question are of the same width in every longitudinally extending row. With the use of lengths as short as these, they need not be provided with transversely extending incisions, but may be arranged so as to abut against each other at the ends thereof. It should be observed here, however, that the lengths of adjacent rows are staggered relatively to one another, so that the end portions of such lengths are displaced relatively to each other in the longitudinal direction. If desired, the lengths 11 forming the outer edges of the board may be made of the same length as that of the board, while the remainder of the core layer is composed of short lengths. Finally, the pieces of veneer 12, 13, 14 intended to form the covering layer or the binding layer located between the parquet lengths and the lengths of the core layer, are cut out beforehand.

With the aid of the material thus made in order, the boards are manufactured in such manner that the parquet veneer lengths 9, 10 are first placed on the base plate 1 to the desired pattern between the longitudinally extending edge of the supporting bar 5 on the one hand and the inner edge of the supporting bar 8 on the other hand. Figure 1 shows the parquet lengths thus laid in. After that, the binding layer 14 is first placed on top of the parquet lengths, whereupon the lengths 11 are put in place, as shown in Figure 2. Here, the lengths 11 may be placed in a manner such that a free space of one or a few millimeters is formed between the lengths, in order to permit of expansion of the lengths of the core layer in a lateral direction under the influence of moisture. Another procedure consists in first providing the lengths 11 at the lateral sides thereof facing one another, with channels or elevations, so that the lengths when laid into the matrix may be caused to bear directly on one another in a lateral direction, the channels or grooves being preferably so narrow that the side surfaces of the lengths are caused to bear on each other at points only. In most cases, it is sufficient for this purpose, in the sawing of the lengths at the side edges thereof, to make use of a coarse saw, so that the lengths will obtain an irregular surface structure at the said sides, such structure while affording a support for the lengths still permitting expansion of the lengths in a lateral direction in which the channels or grooves are deformed. Another way of obtaining play between the lengths consists in using spaced pieces of comparatively soft material between the lengths.

Simultaneously with, or prior to the placing of the lengths in the matrix, the parquet lengths and the lengths of the core layer have been provided with a coating of glue on the surfaces paralleling the plane of the board and bearing on each other. This may preferably be effected by applying thin leaves or a film of glue between the various layers, said glue being dry at ordinary temperature. Glue is preferably coated or applied also on to the edges of the parquet lengths directed toward one another, but not onto the opposing lateral edges of the lengths 11 of the core layer. After that, the veneer layers 12, 13 are applied and secured to the lengths 11, for instance by means of tacks. After the various parts have thus been placed in the proper position relatively to each other, the outer bars 2, 4, 6, 7 are tightened up powerfully against the parquet veneer layer, so that the latter will be clamped and subjected to pressure between the supporting bars 5, 8 and between the transversely extending bars 6, 7. The width of the lengths 11 is so adapted that the core layer will at the same time be subjected to a slight or lesser pressure in a lateral direction between the bars 2, 3, 4. To prevent the parquet veneer layer from being broken up under the influence of the lateral pressures, the boards while being subjected to pressure may at the same time be subjected from the sides to a pressure acting from above, for instance by means of a pressing plate 12a arranged on top of the covering veneer layer. The various parts are thus fixed relatively to each other. The matrix with the boards thus composed is then introduced into a press, in which the boards are subjected to pressure by means of a pressing plate acting against the covering veneer layer, while heat is being supplied to the boards at the same time, preferably through the pressing plates. After the pressing plates have been cooled down and the glue has been caused to set, the matrix is removed from the press.

The board is then operated upon along the lateral edges thereof in a planing machine or milling machine for the purpose of providing straight and parallel side edges. In the example shown the boards are intended to be rabbeted, the edges being planed and milled in such manner that the one edge will show a tongue 15 and the other a groove 16. The outer lengths 11 of the core layer and the veneer layers 12, 13, 14 only are affected by this operation, whereas the parquet veneer layer need not at all be operated upon at the edges thereof, or will need an immaterial working only. To this end, the parquet veneer layer according to the invention has been given already from the beginning a width corresponding substantially to that of the finished parquet board, and when laid into the matrix it is displaced relatively to the remaining layers so that the portions of the layers to be trimmed will project outside the lateral edges of the parquet veneer layer, as indicated at 17 and 18. This is effected by the supporting bars 5 and 8 protruding inwardly beyond the inner surfaces of the bars 2, 3, 4, a distance corresponding to the portions 17 and 18 to be removed. The tongue 15 is then formed from one of the lateral edges of the board to a depth corresponding to the distances between the inner surfaces of the bar 3 and the inner edge of the bar 5. At the opposite edge of the board, so much material 18 is removed as corresponds to the distance between the inner edge of the supporting bar 8 and the inner surface of the bar 2, 4. The groove 16 is cut in connection therewith. In the working of the lateral edges of the boards the veneer layers 12, 13, 14 are also cut off in a corresponding degree. If the board is not to be rabbeted, the distance between the side surfaces of the bars 3, 5 and 2, 8 respectively is only made as large as is required to impart regular and straight edges to the board without any working of the parquet veneer layer.

The pressure exerted on the board in a lateral direction primarily has for its object to bring about proper bearing between the parquet lengths before they are glued together, so that the parquet lengths on having been glued together will be under the influence of the remaining, laterally effective binding force. The binding of the lengths in the finished board is effected, in addition to the glue in the edges of the parquet lengths bearing on one another, also and above all by the veneer layer 14 which, in order to take up the lateral forces, is arranged with its run of grain extending in the transverse direction of the board. To render possible powerful pressure being exerted on the parquet veneer layer in a lateral direction, it is necessary that the lengths of the core layer be given a width so adapted that less pressure is exerted on the core layer than on the parquet veneer layer. Actually, the pressure on the core layer should be effected with the exertion of a power as small as possible, so that the capability of the lengths of the core layer to expand in the lateral direction is maintained. Consequently, the pressure on the core layer should not be effected with a power greater than necessary to bring the lengths to bear on one another and on the lateral edges of the matrix, the channelled surface of the lateral edges of the lengths bearing on each other then having the effect that the core layer will be contracted due to the lateral pressure.

As an example of suitable dimensions of a board of the type described, it might be mentioned that the board may have a length of 3 to 5 meters and a width of 10 to 15 centimeters.

I claim:

1. A method of manufacturing a composite board comprising making at least three layers consisting of a first layer of parquet lengths arranged in the fashion of a parquet pattern, a second layer of veneer of greater width than the parquet layer, and a third or core layer of pieces of wood extending lengthwise of the board, said core layer being arranged between the first and second layers and being of greater width than the first layer, compressing the parquet layer and in a less degree the core layer laterally while preventing the board from moving perpendicularly to its opposite side surfaces, firmly securing said layers to one another, and trimming and shaping the edges of the core and second layers until the width thereof has been reduced to coincide substantially with the width of the first layer.

2. A method of manufacturing a composite board comprising at least three layers consisting of a first layer of parquet lengths arranged in the fashion of a parquet pattern, a second wider layer of veneer, and a wider third or core layer arranged between the first and second layers and formed of pieces of wood arranged side by side and extending lengthwise of the board, which comprises compressing the parquet layer, and in a less degree the core layer laterally while preventing the board from moving perpendicularly to its opposite side surfaces, firmly securing the layers together, and subsequently trimming away the overhanging parts of the second and third layers.

3. A method as claimed in claim 2 in which the confronting side surfaces of the pieces of the core layer are made irregular prior to such compression.

4. A method of manufacturing a composite board comprising at least three layers consisting of a first layer of parquet lengths arranged in the fashion of a parquet pattern, a second layer of veneer, and a third or core layer arranged between the first and second layers and formed of pieces of wood arranged side by side and extending lengthwise of the board, which comprises coating the layers with an adhesive, superimposing the layers on one another, and compressing the parquet layer and, in a less degree, the core layer laterally while the board is prevented from moving perpendicularly to its opposite side surfaces, whereby the side edges of the composite board are straightened even if individual lengths of the parquet layer and of the core layer are somewhat different in breadth.

5. A method as claimed in claim 4 in which the confronting side surfaces of the pieces of the core layer are made irregular prior to such coating and compression.

6. A method of manufacturing a composite board comprising at least three layers consisting of a first layer of parquet lengths arranged in the fashion of a parquet pattern, a second wider layer of veneer, and a wider third or core layer arranged between the first and second layers and formed of pieces of wood arranged side by side and extending lengthwise of the board, which comprises firmly securing the layers to one another by an adhesive and compressing the parquet layer and, in a less degree, the core layer laterally while preventing the board from moving perpendicularly to its opposite side surfaces, and subsequently trimming away the overhanging parts of the second and third layers.

GUSTAF KÄHR.